Sept. 22, 1936.　　　M. ZAIGER　　　2,055,397
SUCTION CUP
Filed June 19, 1936

Inventor.
Max Zaiger
by Heard Smith & Tennant.
Attys.

Patented Sept. 22, 1936

2,055,397

UNITED STATES PATENT OFFICE 2,055,397

SUCTION CUP

Max Zaiger, Lynn, Mass.

Application June 19, 1936, Serial No. 86,039

2 Claims. (Cl. 248—206)

This invention relates to suction cups and it has for its general object to provide an improved suction cup constructed so as to facilitate its application to a sheet of glass and to increase its holding quality.

Suction cups are commonly made of rubber molded to present a concave suction face and a convex exterior face, said faces meeting at the periphery of the suction cup to form a relatively thin edge and the body of the suction cup having a progressively-increasing thickness from the edge to the central portion thereof. In applying a suction cup to a pane or sheet of glass or other material the concave suction face is placed against the glass, and then the suction cup is pressed toward the glass to flatten the concave face and expel the air from between the concave face and the glass.

When pressure is thus applied to the suction cup to attach it to a sheet of glass the relatively thin peripheral portion of the cup readily flattens out, but it frequently requires considerable force to flatten the central portion of the concave face because of the increased thickness of the body portion at or near the central part thereof. Moreover, since the suction cup is molded in the concavo-convex shape the flattening of the suction face places the material of the suction cup under internal strain, the extent of which varies at different points of the body portion according to the thickness thereof, such internal strain being greatest at the thicker central portion of the body. After the suction cup is applied to the glass the internal strains in the body portion tend to restore the body portion to its normal shape, and these strains have the effect of reducing the load which the suction cup, when applied to the glass, will support.

According to the present invention I have provided an improved suction cup molded to present normally a concave suction face and a convex exterior face, and which is so constructed that the body thereof is provided with a plurality of annular zones, one of which is relatively near the central portion of the cup, and within which there is a decreased resistance to the flattening of the suction face, and the presence of which reduce the internal strain within the body tending to force it back into its normal concavo-convex shape after it has been applied to the glass or other sheet material.

With my improved suction cup, therefore, the application thereof to the glass is facilitated and the suction cup has a better holding quality.

In the drawing wherein I have illustrated a selected embodiment of the invention, Fig. 1 is a sectional view of a suction cup embodying my invention in its normal shape.

Figure 1:
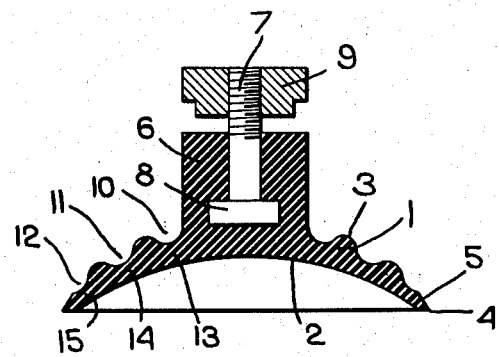

In the drawing 1 indicates the body portion of the suction cup embodying my invention. This body portion is molded from rubber or other suitable material so as to present a concave suction face 2 and a generally convex exterior face 3, said faces meeting at the periphery 4 of the cup and thus forming a relatively thin peripheral portion 5 as usual in suction cups of this type. The body 1 is also shown as formed at its central portion on its exterior face with a boss or extension 6 which is provided with means for attaching the suction cup to the article with which it is to be used.

In the construction shown the boss 6 has molded therein a screw-threaded stem 7 provided with a head 8 that is embedded in the rubber and a clamping nut 9 is screw-threaded to the head.

It will be understood that when in use the stem 7 extends through an aperture in the article with which the suction cup is used and the nut 9 clamps said article to the suction cup.

The body 1 is molded so as to present a plurality of annular zones within which the material of the body is thinner and more easily flexed than at other portions. These zones can be provided for by molding the body 1 so as to provide it with a plurality of annular grooves on its exterior.

In the construction shown three such grooves are illustrated which are indicated at 10, 11 and 12. The groove 10 is near the central portion of the suction cup and is shown as immediately surrounding the boss or extension 6. The annular groove 12 is adjacent the edge 4 and the annular groove 11 is intermediate the grooves 10 and 12. The presence of these grooves reduces the thickness of the body 1 where the grooves are located, and these grooves thus establish annular zones 13, 14 and 15 within which the body is more flexible than between the grooves, and within which zones there is less resistance to the flexing of the body when the suction cup is being applied to the glass 16.

Figure 2:
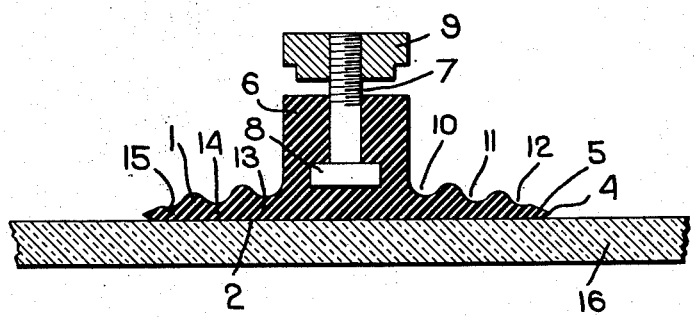
Fig. 2 shows a suction cup pressed against a sheet of glass and with the concave suction face flattened and in contact with the glass.
Figure 3:
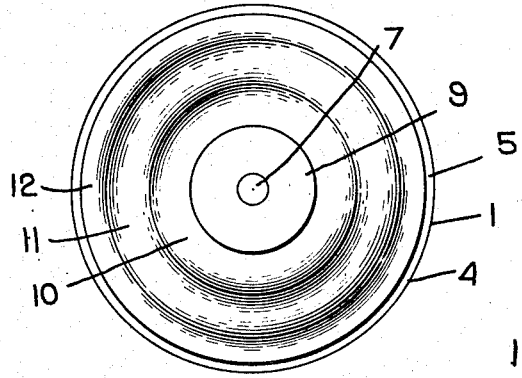
Fig. 3 is a plan view of the suction cup.

When the suction cup is pressed against the glass 16 the body portion thereof will flex or yield in the annular zones 13, 14 and 15 as the suction face 2 is flattened out into the position shown in Fig. 2, and because the body is reduced in thickness within these zones the suction cup can be flattened against the glass with the application of less pressure than would be required if the zones of reduced thickness were not present.

The forcing of the suction cup against the glass so as to spread said cup and flatten the suction face into contact with the glass expels all the air between the suction face and the glass, as shown in Fig. 2.

When the pressure is released the internal strains, to which the suction cup is subjected as it is flattened against the glass, will tend to restore the suction cup to its normal concavo-convex shape, and the center portion of the suction cup will separate slightly from the glass, thereby forming a vacuum chamber. The force thus tending to separate the center portion of the suction face 2 from the glass 16 is only that due to the thickness of the material in any one of the zones, and, therefore, the suction produced by the suction cup does not have to resist as heavy an internal strain in the body as if said body were not made with the zones of reduced thickness. Consequently, the suction cup is capable of supporting a larger load and it has increased holding qualities.

While I have herein illustrated a suction cup as being made with three zones of reduced thickness, yet I do not wish to be limited to the number of the zones as these may be various without departing from the invention.

My improved suction cup is especially well adapted for use in securing a so-called "defroster" to the windshield of an automobile, not only because of its superior holding qualities, but also because by reason of its construction it will hold the sealing strip or sealing lip of the defroster in close contact with the glass of the windshield.

As I have stated above, the presence of the zones of reduced thickness in my improved suction cup reduces the strains within the body tending to separate the center portion thereof from the glass, and as a result the suction cup, after it has been applied to a sheet of glass, will retain approximately its flattened shape, thus holding the sealing lip of the defroster closely against the glass.

I claim.

1. A suction cup having a body portion with a concave suction face and a convex exterior face, said body portion having a plurality of ribs on the exterior surface thereof with a plurality of annular zones therebetween, whereby when the suction cup is pressed against a support the ribs and zones of reduced thickness cooperate to produce a plurality of suction zones.

2. A suction cup having a body portion with a concave suction face and a convex exterior face, said body portion having a progressively increased thickness from the edge to the center and having a plurality of ribs on the exterior thereof with a plurality of annular zones of reduced thickness therebetween, whereby when the suction cup is pressed against a support the ribs and zones of reduced thickness cooperate to produce a plurality of suction zones.

MAX ZAIGER.